May 19, 1964
C. B. HAUN
3,133,676
PLANTER HAVING PNEUMATIC SEED HANDLING MEANS
Filed Dec. 15, 1960
5 Sheets-Sheet 1
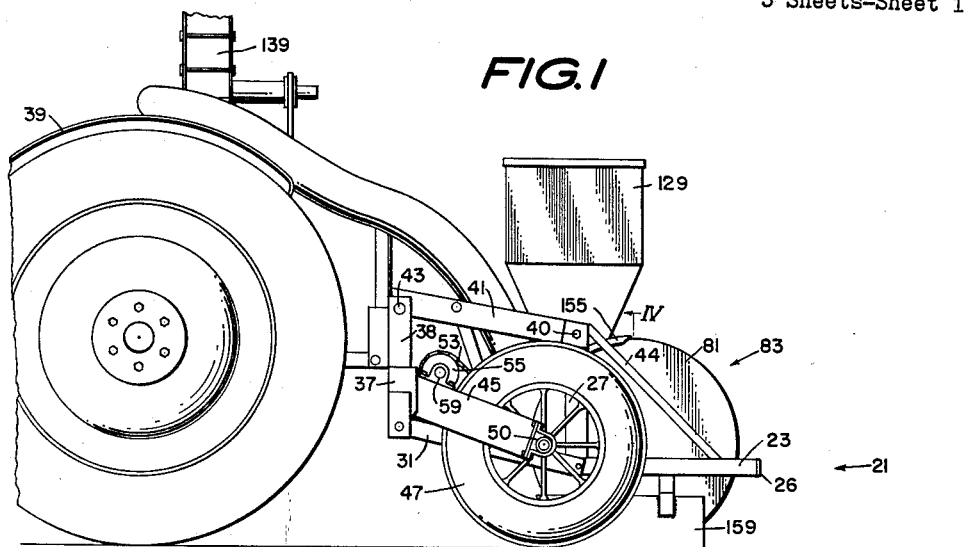
INVENTOR,
CARL B. HAUN
BY
Weatherford & Weatherford
Attys

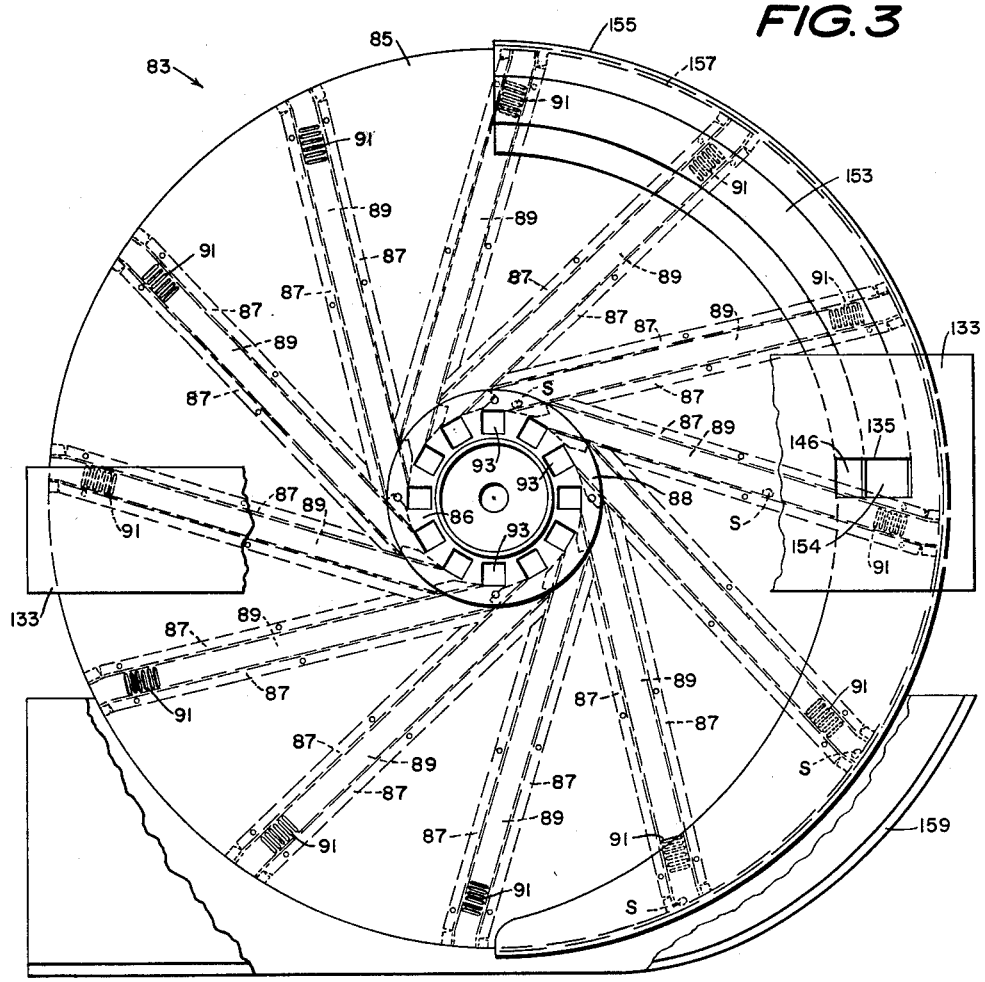

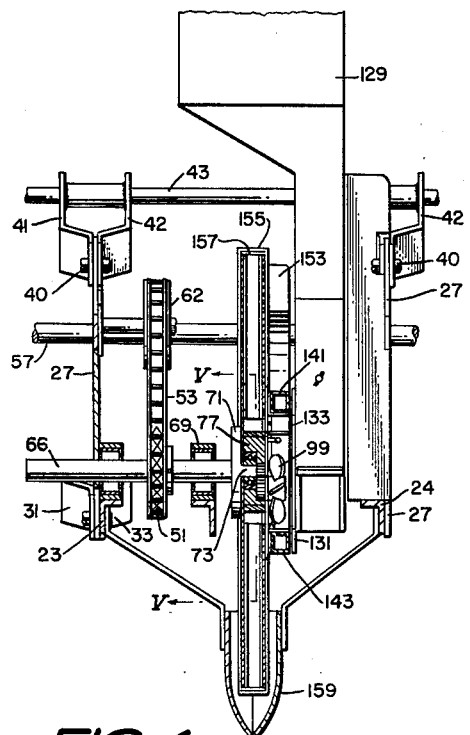

May 19, 1964  C. B. HAUN  3,133,676
PLANTER HAVING PNEUMATIC SEED HANDLING MEANS
Filed Dec. 15, 1960  5 Sheets-Sheet 4
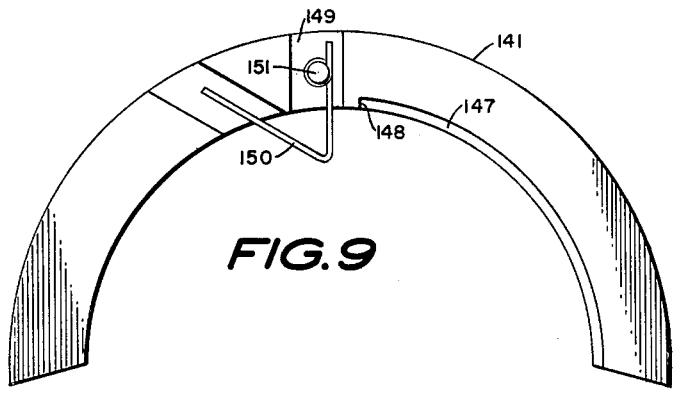
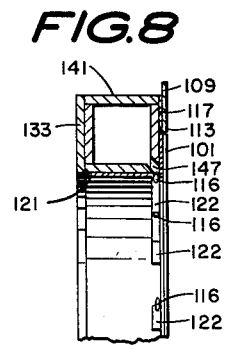
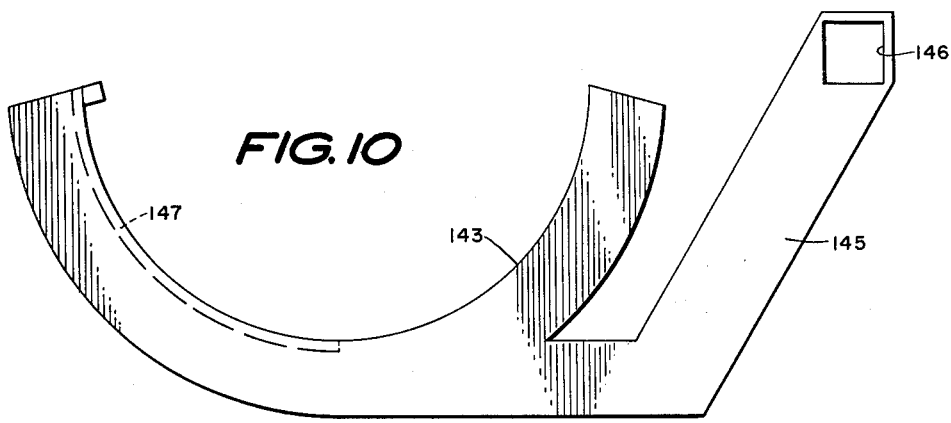
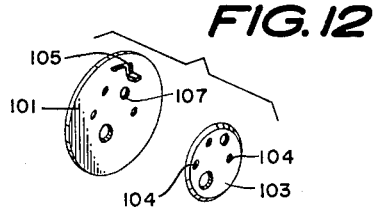
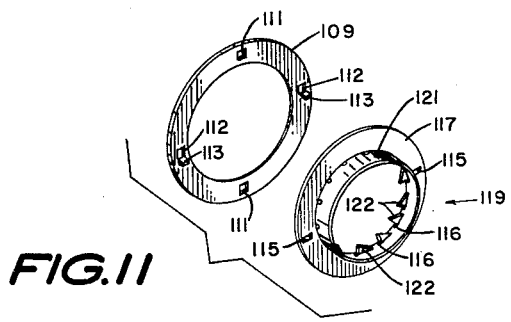
INVENTOR.
CARL B. HAUN
BY Weatherford & Weatherford
Attys May 19, 1964 C. B. HAUN 3,133,676
PLANTER HAVING PNEUMATIC SEED HANDLING MEANS
Filed Dec. 15, 1960 5 Sheets-Sheet 5

INVENTOR,
CARL B. HAUN

United States Patent Office
3,133,676
Patented May 19, 1964

3,133,676
PLANTER HAVING PNEUMATIC SEED
HANDLING MEANS
Carl B. Haun, Pine Bluff, Ark., assignor to Ben Pearson,
Incorporated, Pine Bluff, Ark., a corporation of
Arkansas
Filed Dec. 15, 1960, Ser. No. 75,964
8 Claims. (Cl. 222—177)

This invention relates to certain new and useful improvements in planters utilized in connection with agricultural activities, and in particular relates to seed planters adaptable for use with a wide variety of types of seed and specifically adapted substantially to insure extreme accuracy in the selection and deposit of such seed along a crop row.

There have heretofore been many attempts to provide planters for the deposit of crop seed along crop rows which have largely been impeded on account of inaccuracies in the measuring and deposit of the crop seed. Among these prior devices, and among the most successful thereof, is the planter device as shown in Bramblett 2,783,918, but even this device does not achieve the efficiency and superiority of action which is accomplished by the planter of the present invention.

The device of the present invention comprises a planter wheel of a more simple yet more durable and efficient construction, comprising a pair of plates with interposed pairs of structural elements forming a plurality of circumferentially spaced channels or passageways, substantially tangentially extending from the hub of the overall wheel to the periphery thereof. The planter wheel is driven as by coupling to ground contacting wheel means via intermediate chain and sprocket members, and a seed-selecting planter plate is connected to one of the wheel plates for rotation concurrently therewith. The planter plate rotates within a bin mounted to receive gravity flow of seed from a hopper, and a regulator is coupled within the bin for reverse rotation relative to the direction of rotation of the planter plate and in opposition to the direction of gravity flow from the hopper. Pneumatic means are provided for holding selected seed against lugs of the planter plate to prevent accidental separation of selected seed from the successive lugs during planter plate rotation, and conjointly operated pneumatic means are provided to transfer the selected seed from an individual lug into its corresponding and related passageway of the planter wheel at a selected delivery point. Thereafter deposit by gravity of such transferred seed, retained in the wheel by surrounding shoe means, is accomplished along the crop row.

The principal object of the present invention is to provide a new and novel means for planting crop seed.

A further object of the present invention is to provide seed planting means together with new and novel cooperative pneumatic means for controlling the selection, transfer and deposit of crop seed.

A further object of the invention is to provide, in cooperation with a planter wheel having substantially tangential seed traversing passageways, a new and novel planter plate, having a plurality of lugs, rotatable with the planter wheel, and with the respective passageways of the planter wheel being related to the respective lugs.

A further object of the invention is to provide in such a planter a regulator coupled to a driven shaft for rotation reversely relatively to the rotation of the planter wheel and opposing the direction of seed flow toward the planter wheel for regulating the height of seed adjacent the planter plate.

A further object of the invention is generally to improve the design, construction and efficiency of planter devices for use in the planting of crop seed.

The means by which the foregoing and other objects of the present invention are accomplished and the manner of their accomplishment will be readily understood from the following specification upon reference to the accompanying drawings, in which:

FIG. 1 is a side elevational view illustrating a preferred embodiment of the present invention, the tractor to which it is coupled being shown fragmentarily.

FIG. 2 is a top plan view of a multiple form of the planter means of FIG. 1.

FIG. 3 is a fragmentary side elevational view on an enlarged scale illustrating the planter wheel and related parts with certain parts being shown in dotted lines and other parts being broken away for purposes of illustration.

FIG. 4 is a vertical sectional view taken as on the line IV—IV of FIG. 1.

FIG. 5 is a further enlarged fragmentary view (with parts removed) as on the line V—V of FIG. 4.

FIG. 6 is a further enlarged fragmentary sectional view taken as on the line VI—VI of FIG. 5.

FIG. 7 is a fragmentary side view with parts removed for illustration, and particularly illustrating the planter plate, regulator and related parts.

FIG. 8 is an enlarged fragmentary sectional view taken as on the line VIII—VIII of FIG. 7.

FIG. 9 is a rear elevational view illustrating one side of a part of the seed handling pneumatic means.

FIG. 10 is an elevational view of the opposite side of an additional part of the pneumatic means.

FIG. 11 is an exploded perspective view of the planter plate and the mounting ring therefor.

FIG. 12 is a perspective view of the seed backing plate and regulator cover plate of the device.

FIG. 15 is a fragmentary elevational view, on an enlarged scale, of an alternate form of the seed adaptor plate of the device.

FIG. 16 is a perspective view of an alternate form of the planter plate of the device.

Figure 13:
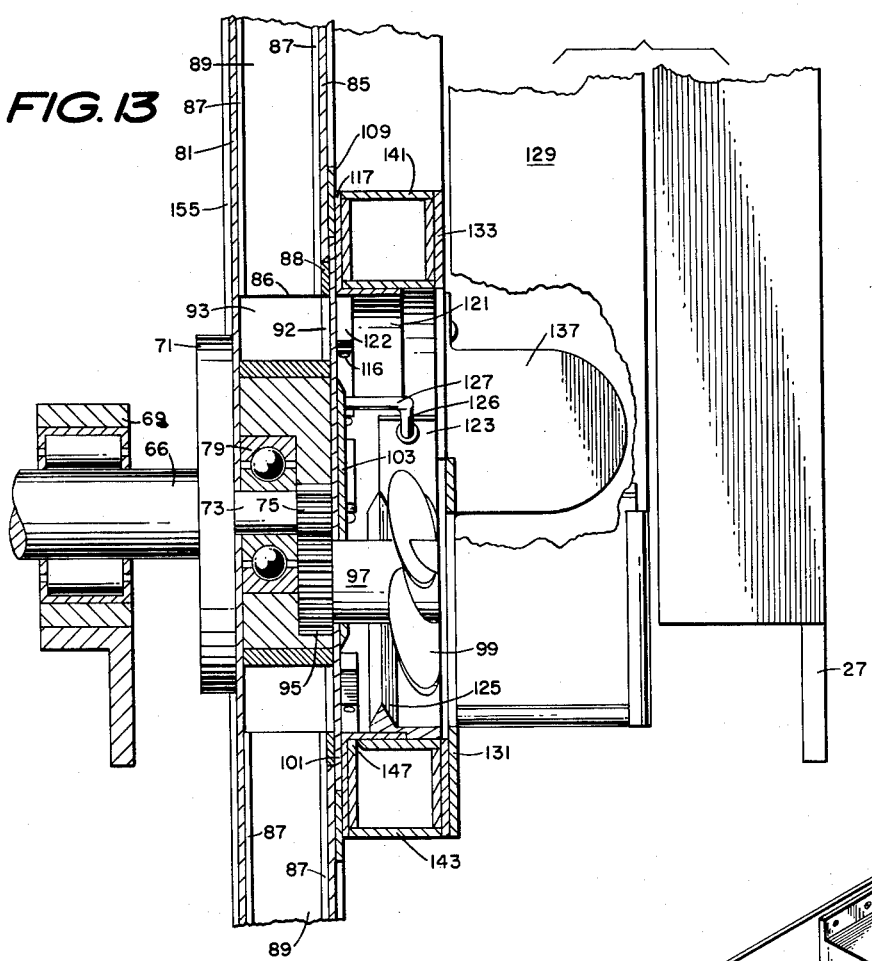
FIG. 13 is a fragmentary vertical sectional view on an enlarged scale, with parts removed, illustrating details of the device.
Figure 14:
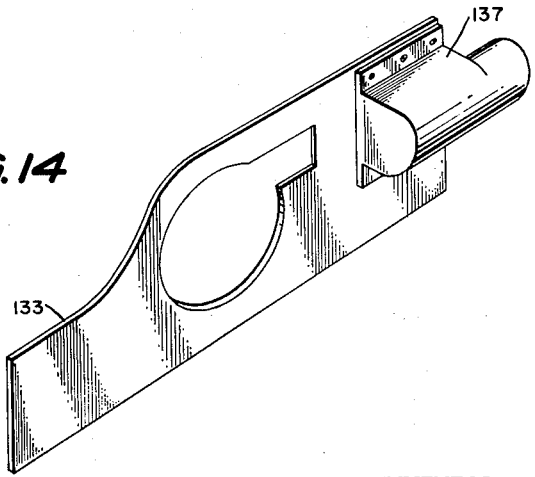
FIG. 14 is a perspective view of the intermediate support plate of the device with pneumatic means affixed thereto.

Referring now to the drawings in which the various parts are indicated by numerals, the planter device of the present invention is mounted upon a chassis 21, which comprises a pair of opposite substantially parallel frame members 23, 24 rigidly connected at their rearward extremities by a lateral bar 26, and pivotally attached at their forward ends to a pair of upstanding legs 27, 29 carried by dual opposite links 31, 33 rotatably attached as by a shaft 35, suitably mounted on a tow bar 37, carried and drawn by a conventional tractor means 39, illustrated here fragmentarily.

Mounted to the upper ends of upstanding legs 27, 29 as by bolts means 40, and projecting forwardly in parallel spaced relation above the frame members 23, 24, a similar pair of frame members 41, 42 extend to and are rotatably mounted upon a shaft 43, rigidly anchored to tow bar 37, at opposite sides of the chassis 21, to arms 38. Brace bars 44, attached at their upper ends to upstanding legs 27, 29, and at their lower ends to frame members 23, 24 as by welding or other suitable means, increase rigidity of the support members of the device allowing the device to be raised or lowered over uneven terrain without changing substantially the attitude of the device with respect to the earth's surface.

Extending rearwardly from the tow bar 37, and attached thereto by brackets 45, a pair of ground contacting wheels 47, are mounted on cross shafts 49 carried in suitable bearings 50 mounted on the respective brackets 45. Carried on shaft 49 is a sprocket 51, drivingly coupled as by a chain 53 entrained under an idler sprocket 54, to a forwardly positioned sprocket 55, coupled to a lateral shaft 57 carried in suitable bearings 59 mounted on the respective brackets 45.

Carried on shaft 57 is a sprocket 61 drivingly coupled as by a chain 63 passing over an intermediate tensioning idler pulley 62 to a rearwardly positioned sprocket 65, rotatably mounted on a cross shaft 66, journalled in suitable bearings 67, 69 and extending inwardly from the frame member 23 and the bearing 67.

Shaft 66 extends inwardly from bearing 69, and adjacent its inboard end, is provided with a disc-like attachment flange 71. Shaft 66 extends beyond the attachment flange preferably in a reduced shaft section 73. At its innermost end shaft section 73 is provided with a splined or gear section 75 which extends inwardly through a hub member 77 in which is nested a gear box and bearing member 79.

Fixed to flange 71 is the outer plate 81 of planter wheel 83. Planter wheel 83 comprises outer plate 81, through which reduced shaft section 73 extends at its center, and an inner plate 85, substantially tangentially extending circumferentially spaced pairs of structural elements 87 being interposed between plates 81, 85, and forming in the preferred embodiment of the device passageways 89 leading tangentially outwardly from the central hub part of the wheel 83 to its periphery. Preferably substantially tangentially disposed structural members 87 each comprises a member which is substantially C-shaped in cross section having end flanges being solidly seated against the opposite plates 81, 85, and the web elements perpendicular to and effecting spacing between the two plates so that the respective pairs of structural members 87 each defines an open passageway 89 leading tangentially outwardly from the hub of planter wheel 83 to the periphery thereof.

Additionally it will be observed that the planter wheel provides a very sturdy structure with the two disc-like plates 81, 85 being seated against the flanges of members 87, and being secured thereto rigidly and permanently in such a manner as to prevent their separation and also to provide the additional structural strength from the pair of disc-like plates and the plurality of pairs of structural members sandwiched between the disc-like plates.

Inner plate 85 is centrally apertured to contain a distributor plate 86 comprising a flanged section 88 seated in the aperture and substantially flush with the surface of the plate 85, and detachably connected thereto, with an outwardly extending cylindrical crown portion 90 which abuts the root terminals of the passageways 89, the crown 90 being provided with a plurality of orifices 92 substantially equal in number with, and in register with, the correspondingly alined openings in the root terminals of the passageways 89. The distributor plate 86 is additionally centrally apertured to embrace and rotate around the hub member 77. Adjacent the outer periphery of one of the wheel plates, as inner plate 85, the plate is provided with a plurality of substantially radially spaced sets of slots 91 which are positioned respectively in communication with the passageways 89 formed in tangentially spaced relationship in planter wheel 83. Adjacent distributor 86 one of the plates, as plate 85, is provided with a plurality of apertures 93 which respectively communicate with passageways 89 adjacent their respective root ends, thus effecting communication from the central portion of planter wheel 83 to the outer part thereof. It will be observed that the peripheral outer ends of passageways 89 are open.

Within the gear box 79, an additional spur gear 95 is meshed with spline section 75 of shaft 73, gear 95 being fixed upon a stub shaft 97 to the inner end of which is fixed a regulator means 99. Regulator shaft 97 is radially offset from shaft 73 and is somewhat diagonally downwardly disposed relative thereto and projects through and is journalled in a backing plate 101. Interposed between regulator means 99 and backing plate 101 is a lock plate 103 detachably connected to the gear box 79 by suitable bolt means passing through respectively alined apertures 104 in lock plate 103, backing plate 101, and gear box 79. It will be observed that the bolt means passing through the alined apertures contain the backing plate 101 and the lock plate 103 in fixed nonrotatable position adjacent the gear box 79.

Backing plate 101 is provided with a single orifice 105 which is radially positioned relative to the center of the planter wheel 83 for successive register with the apertures 93 in wheel 83 as the wheel is rotated past the backing plate. It will be seen that backing plate 101 fits snugly against inner wheel disc 85 and blocks all of the apertures 93 except the single aperture moved into register with orifice 105. Preferably backing plate is provided with an additional slightly enlarged aperture 107.

Encircling backing plate 101 is an annular connector 109 provided with a plurality of radially oppositely spaced apertures 111 with alternately radially interposed apertures 112 having inwardly deformed tabs 113 which extend through correspondingly alined apertures 115 of the annular brim section 117 of a planter plate 119. Extending inwardly of the brim 117 a frusto-cylindrical crown section 121 of the planter plate 119 is provided on its inner diameter with a plurality of substantially triangularly formed lugs 122 extending radially inwardly toward the center of the plate 119. The crown section 121 is further provided with a plurality of radially spaced ports 116 to communicate with pneumatic means, the ports and pneumatic means hereinafter to be discussed.

The planter plate 119 and the adjacent annular connector 109 detachably connected as by the tabs 113 seated in the respectively alined planter wheel apertures 115 are further secured to the inner plate 85 of the planter wheel by suitable means.

Seated adjacent the inner diameter of the brim section 117 is an arcuate collar section 123 deformed at its inner end into a substantially arcuate bevel guide 125 of triangular cross section in spaced relation to the lugs 122 of the flange 121 on the planter plate 119. Inwardly of the forward terminus of the collar 123 and rigidly attached to the collar an anchor 126 projects rearwardly somewhat upwardly toward the central axis of the collar 123 with a deformed tip portion 127 thereof extending substantially axially outwardly toward the lock plate 103 and is affixed thereto by means of insertion through the aperture 107 in the lock plate 103.

Planter plate 119 projects inwardly away from spoke wheel 83 and defines a bin-like area which is adapted to receive seed deposited by gravity from hopper 129, hopper 129 being connected with chassis 21. The hopper is positioned forwardly of the axial center of planter wheel 83 and deposits the seed delivered thereinto by gravity in a rearward direction of flow, this flow turning somewhat outwardly at the terminal end of the hopper in order to discharge into the bin interior of the planter plate.

Regulator 99 projects into the bin area defined by the planter plate 119, and in virtue of its gearing is driven in a direction of rotation opposite to the direction of rotation of wheel 83 and also opposed to the gravity urged flow of seed from hopper 129, thus controlling the height of seed in the bin area.

Rearwardly of hopper 129 a retainer plate 131 is fixed to frame plate 133, provided with a central opening to fit over the innermost edge of plate 119 and permit the rotation of plate 119. Frame plate 133 is mounted upon and secured to the chassis of the device and provides a shielding cover for the elements thereof. Preferably retainer 131 is fixed in position by detachable bolts which may have spring elements interposed in order to give a resiliency to the mounting of retainer 131 and frame plate 133 which is interposed between hopper 129 and wheel 83 is provided with an aperture 135 for communication with a pneumatic assembly and a vacuum manifold 137 communicated with a vacuum fan 139 mounted upon tractor 39 and powered by the tractor.

Fixed to the frame plate 133, and interposed between the frame plate and brim 117 of the planter plate 119, is an air conduit of circular conformation preferably formed for ease of installation into two parts, an upper conduit part 141, and a lower conduit part 143 which is connected to an air communicator 145 having an aperture 146 mounted in register with aperture 135 formed in frame plate 133. Conduit parts 141, 143 and air communicator 145 are formed as hollow members, the air conduit parts 141, 143 being concentrically arcuate and adapted to mate together to form a complete conduit ring. The interior of the conduit ring formed by conduit parts 141, 143 is of a diameter to closely and slidably fit the exterior of planter plate flange 121. Preferably upper air conduit part 141, along the junction of its outer face with its interior surface, is provided with an arcuate slot 147, best shown in FIG. 9, and when air conduit part 141 is mounted upon the device slot 147 is positioned in adjacency to the junction between planter plate brim 117 and planter plate 119 so as to communicate, as best shown in FIG. 8, with the flange ports 116 communicating the respective lugs 122 with the exterior of the planter plate. Slot 147 extends somewhat less than 90 degrees and when the air conduit parts are mounted together and are fixed upon the device the terminal end 148 is disposed approximately in alinement with the upright or perpendicular position relative to the direction of revolution of the planter plate in the operation of the device.

Embedded in the outer face of the upper conduit ring 141 is an angular cut out 149 substantially V-shaped, provided on one of its legs with a spring 150 of substantial right angular conformation pivotally affixed to the inner face of the slot 149 as by pin 151, the purpose of which spring being a means of dislodging and discharging portions of seeds, seeds, or undesired foreign matter into the passageway 89, which accidentally would be unaffected by the vacuum thus preventing the broken seeds and foreign matter from returning to the bin area of the planter plate 119.

Interposed additionally between frame plate 141 and planter wheel 83 adjacent the radially outer periphery of the planter wheel is an additional short air flow section 153 which is arcuate in conformation and is positioned to overlie the path of revolution of that portion of planter wheel 83 in which is formed slots 91. Outer air passage 153 is fixed to frame plate 133, and is carried thereby, having at its lower end an aperture 154 which is mounted in register with frame plate aperture 135 in order to establish air flow communication between air ring section 153 and manifold 137. Section 153 is substantially channel-shaped and is mounted in position closely adjacent to the inner face of wheel plate 85 so as to establish communication through the successive slots 91 as they are moved by the wheel rotation into the area of air ring section 153 to thus establish suction air flow through the passageways 89 successively in order to accomplish a transfer of material successively into the passageways and to the peripheral outer ends thereof. Integral with the ring section 153, and attached thereto, an arcuate flanged shoe 155 having attached within its internal peripheral face a flexible non-metallic gasket 157 to contain within the passageways 89 the seeds until their discharge, by gravity, into a suitable pre-plowed furrow opened by plow means 159, supported from chassis 21 and preferably embracing planter wheel 83.

It will be observed that retainer plate 131 substantially abuts against the rearward part of hopper 126 so that the hopper in cooperation with retainer plate 131 effect a closure of the bin area defined by the planter plate and its related parts. Preferably hopper 129 opens outwardly into this bin area and seed deposited in the upper end of the hopper discharge downwardly therefrom by gravity and are diverted outwardly toward the rotating planter plate and its seed selecting lugs.

In the use and operation of the device, after it has been assembled as above described, the device is lowered into ground contact through the operation of the conventional power lift mechanism of tractor 39. Furrow opening plow means 159 which are connected to and suspended from frame members 23, 24 have their ground breaking apex formed forwardly of wheel 83. A furrow of desired depth is opened by plow means 159 and with the ground contact of wheels 47 rotation of planter wheel 83 is instituted. A supply of seed S is introduced into hopper 129 to discharge by gravity downwardly and outwardly as heretofore described. The seed thus discharged are intoduced into the bin area primarily defined by planter plate 119, and with the revolution of the planter plate conjointly with the revolution of planter wheel 83 the lugs 122 are moved through the quantity of seed delivered into the aforesaid bin area.

As the seed are thus delivered into this area they are limited in their association and introduction into the area of revolution of planter plate 119 by bevel guide 125, insuring that only a limited quantity of seed S will come into association with the planter plate.

It will be seen that in the bin area, in view of the arrangement of air conduit parts 141, 143, in the lower quadrant of the area of revolution of the planter plate, there is in effect provided adjacent to the planter plate a pick up zone which extends substantially throughout 180 degrees of the circle of revolution of the planter plate, but which is substantially effective for picking up seed throughout approximately 90 degrees of the circle of revolution, this 90 degrees extending from the perpendicularly disposed lower portion of the circle of revolution substantially upwardly clockwise as viewed in FIG. 1 of the drawings.

It will be observed that the planter plate and the planter wheel 83, including the passageways formed through planter wheel 83, are conjointly moved, but that communication between the respective lugs 122 of the planter plate is, during the period of the pick up zone, blocked from communication with the roots of the respective passageways by the interposition of backing plate 101. When an individual lug has been moved by the conjoint revolution of the planter wheel and of the planter plate into what might be termed a substantially horizontal position it is passed thereby beyond the pick up zone and moved into a retention zone.

Inasmuch as the radially outward open part of the lug comes under the influence of suction air flowing through port 116 which is effective to retain against the lug such contents which have been picked up and selected by the lug, the open areaway of the port 116 and its zone of influence upon the planter plate may be defined as a retention zone. It will be seen that throughout its path of travel through the retention zone the individual lug is moving toward an inverted position, and throughout the retention zone is in a position wherein the effect of gravity would tend to remove away from the lug the contents thereagainst. The suction air imparted to the successive lugs during passage through the retention zone is effective, through the communication of orifice 105 with the radially outwardly opened surfaces of the respective lugs so that the flow of suction air imparted by vacuum fan 139 through manifold 137 and communicated through aperture 135 into air communicator aperture 146 and through air communicator 145 to the upper and lower air conduit parts 141, 143 to retain the lug contents engaged therewith.

As the lugs successively are moved through the retention zone to a position approximately perpendicular to the center of the device with regard to the direction of revolution of the planter wheel and of the planter plate, passageway 89 related with a selected lug moves under the influence of outer air ring 153 which is subjected to the same suction air flow from vacuum manifold 137 through aperture 135, so as then to create flow through slots 91 formed in the related passageway 89 to tend to draw the contents of the passageways 89 toward the peripheral outer portion of the wheel 83. When the lug and the related aperture 93 formed in the root end of its related passageway 89 moves into alinement with orifice 105 the lug has then moved from the retention zone and beyond the influence of the air flowing through slot 147, and moves into a transfer position when communication is effected from the outer face portion of the lug through aperture 195, orifice 93, into passageway 89, and transfer of the seed selected and previously retained against the lug to the outer end of passageway 89 is accomplished by the suction effect of the air flowing through outer air ring section 153 and passageway slots 91.

Thus the seed selected by the lug and retained thereagainst by the suction air flow adjacent the lug through slot 147, is transferred from the planter plate outwardly into the passageway 89 of planter wheel 83, and continues substantially adjacent the outer periphery of planter wheel 83 throughout the movement of the lug and its related passageways beyond the transfer zone, which may be substantially coextensive with the length of outer air ring 153 which exerts a continuing influence upon the interior of the related passageway 89 until the passageway and its slots 91 have passed beyond the terminal end of air ring portion 153.

It will be seen that this transfer zone is of somewhat less than 90 degrees in arc so that the passage of the selected passageway beyond a substantially horizontal position diametrically opposite to the beginning of the retention zone provides that the seed S within the passageway having now passed slightly beyond the horizontal is retained by gravity adjacent to the outer periphery of the planter wheel. This is accentuated by the tangential angularity of the passageways in the direction of rotation of the wheel.

In order to prevent the accidental discharge of the seed handled by the mechanism from the planter wheel the outer shoe 155 embraces planter wheel 83 adjacent its outer periphery and extends substantially 180 degrees blocking the outer open ends of passageways 89 throughout the extent of the outer shoe. The shoe terminates at the lowermost extremity of the planter wheel and substantially at the lower end of the vertical center line of the planter wheel.

Through a substantial part of the retention zone shoe 155 is slightly spaced from the periphery of the planter wheel, shielding the wheel but not blocking the air flow through the respective passageways 89. Adjacent the upper part of wheel 83, but rearwardly of the point of beginning of the transfer zone, heretofore referred to, the gasket element 157 is fixed to shoe 155 and extends in the direction of revolution of the planter wheel coextensively with the shoe to the lowermost point of termination of the shoe. Shoe 155 and gasket 157 are interconnected at the beginning of the transfer zone and additionally intermediately attached to the frame plate 133 as hereinbefore described.

After the lug and its related passageway have moved beyond the terminal end of the transfer zone, seed S contained in the passageways are maintained by gravity adjacent to the periphery of planter wheel 83, and prevented from separation therefrom by the shoe means just mentioned. As the passageway in the path of revolution moves downwardly toward a vertically downwardly extending position the position of the seed is against gasket 159, and as the passageways successively leave the lower terminal of shoe 155 and gasket 159 the seed contained in the outer ends thereof are deposited by gravity into the furrow. It will be observed that the point of deposit of seed S from passageway 89 into the furrow corresponds approximately to the beginning of the effective part of the pickup zone of planter plate passing through the seed in the bin area, and that the passageways 89 after the deposit of the seed are inoperative and secluded from seed S until the passageway and its related lug and aperture have been moved into the transfer point at the beginning of the transfer zone.

In an alternate means for modified use of the device, as best shown in FIGS. 15 and 16, a substantially circular distributor 186 is substituted for the similar distributor 86 of the preferred embodiment in the cored portion of the wheel plate 85. The flanged section 188 of the distributor 186 is provided with a plurality of orifices 192 substantially one half the number of corresponding orifices contained in the similar distributor 86, each orifice being of an area large enough in arcuate extent to overlie the alined apertures of a pair of passageways 89. Depending outwardly from the flanged section 188 and abutting the outer wheel disc 81 is an annular crown 190 having on its periphery a plurality of apertures in registered alinement with the root ends of the passageways 89, the apertures being constricted by deflectors 194 blocking radially alternate passageways. Thus it will be observed that as the seed S is transfered through the orifices 192 into the constricted alining apertures, they are diverted by the deflectors 194 and discharged by the suction air flow into successively alternate passageways.

As a further modification a planter plate 219, similar in dimension and configuration to the planter plate 119, and comprised of a brim 217, an abutting, inwardly depending crown portion 221, the crown 221 carrying a plurality of lugs 222 somewhat similar in size than the lugs 122 contained in the preferred embodiment, and a series of elongated slots 216 spaced alternately between the lugs 222.

It will thus be observed that in use with the device, the alternate planter plate 219 can be employed to transport and transfer into the respective alternate passageways 89, by means of the aforementioned suction air flow means, a plurality of seeds, such as corn or the like, held against the planter plate crown by the elongated slots 216.

Figure 17:
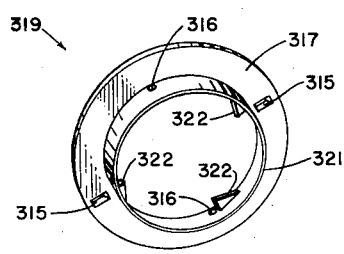
FIG. 17 is a perspective view of an additional alternate form of the planter plate of the device.

As an additional further modification an alternate planter plate 319 as best shown in FIG. 17 being of substantially similar dimension and configuration to the plate 119, is comprised of a circular brim 317, an abutting inwardly depending flange section 321, the flange section 321 carrying on its internal surface a plurality of substantially diametrically opposed triangularly formed lugs 322, the lugs 322 being substantially equal in size to the lugs 122 of the planter plate 119 but somewhat less in number than the lugs 122, and a series of perforations 316 carried by the flange 321 and adjacent the leading faces of the lugs 322.

It will thus be observed that in use with the device, the alternate planter plate 319 can be employed to transport and transfer single seeds into one or more selected passageways 89, and if more than one passageway is selected they are circumferentially equally spaced about the planter wheel, thus when one or more passageway is utilized a substantially uniform spacing of seed deposit into the furrow is established and maintained.

I claim:

1. In a seed planter device, a revolvably supported seed planter wheel comprising an outer circular disc, an inner circular disc, a plurality of pairs of structural members interposed between said discs and spacing said discs apart with said discs being firmly seated against and secured to said members, the members of each said pair of structural members being spaced apart to define a passageway, the respective said member pairs projecting tangentially from adjacent the hub part of said wheel in circumferentially substantially equally spaced relation establishing tangentially extending passageways angularly inclined from the hub part of the wheel in the direction of wheel revolution, one of said discs closely adjacent its radially outer periphery having a plurality of sets of slots, said sets of slots being respectively spaced inwardly of and positioned in registering communication with the outer ends of the respective said passageways, said one disc adjacent but spaced from its axial center being apertured with a like plurality of apertures, said apertures respectively communicating with the inner root ends of the respective said passageways, a seed selecting planter plate having a flat brim secured to said one disc, said planter plate being conjointly revolvable with said wheel and including a circular flange joining said brim projecting perpendicularly away from said brim and said disc, a like plurality of lugs formed in said flange adjacent its junction with said brim, said lugs projecting into the interior of said flange, said flange provided with a like plurality of ports adjacent said flange, said lugs being respectively in registered alinement with the respective said passageway apertures, whereby said wheel includes a plurality of tangentially extending passageways each of which has a related lug, fixed backing means between said one disc and said lugs segregating said lugs from said apertures throughout a majority of the circle of revolution of said wheel and ring, said backing means including an orifice positioned at an upper transfer position for successive lug and aperture registry under wheel revolution, air suction means, part of said air suction means including a conduit embracingly surrounding said flange, said conduit having a slot in adjacency to said lugs through a retention zone along the upper part of the path of lug travel and effecting air suction communication to retain against said lugs the lug contents during lug inverted travel through said retention zone, said slot terminating substantially adjacent said transfer position, said air suction means including an outer air flow section positioned adjacent the periphery of said wheel to overlie said wheel slots and establish suction flow successively to the outer ends of said passageways under wheel revolution, said section having its initial end disposed substantially at the radial line intersecting said transfer position, whereby suction flow is established to transfer lug contents through said orifice and to deliver said contents to the outer end of said passageways respectively, said air flow section terminating at a position where the successive passageways are substantially horizontal, means blocking the outer open ends of said passageways extending from said transfer position and ending adjacent the lower extremity of said wheel, said passageways being successively moved past the end of said blocking means to deposit by gravity the passageway contents upon the ground beneath, means for rotating said wheel, and means for establishing air suction in said air suction means.

2. In a seed planter device, a revolvably supported seed planter wheel comprising an outer disc, an inner disc, a plurality of structural members interposed between said discs and spacing said discs apart with said discs firmly seated against and secured to said members, said structural members being spaced apart and defining passageways between adjacent members, the respective said passageways projecting tangentially from adjacent the hub part of said wheel in circumferentially substantially equally spaced relation and being angularly inclined from said hub part in the direction of revolution of said wheel, one of said discs closely adjacent its outer edge being slotted in registering communication with the outer ends of the respective said passageways, the slots in said one disc being spaced inwardly from the outer ends of the respective said passageways, said one disc adjacent but spaced from its axial center being apertured with a plurality of apertures, said apertures respectively communicating with the inner root ends of the respective said passageways, a seed selecting planter plate having a flat brim secured to said one disc, said planter plate being conjointly revolvable with said wheel and including a circular flange joining said brim projecting perpendicularly away from said brim and said disc, a like plurality of lugs formed in said flange adjacent its junction with said brim, said lugs projecting into the interior of said flange, said flange provided with a like plurality of ports adjacent said lugs, said lugs being respectively in registered alinement with the respective said passageway apertures, whereby said wheel includes a plurality of tangentially extending passageways each of which has a related lug, fixed backing means between said one disc and said lugs segregating said lugs from said apertures throughout a majority of the circle of revolution of said wheel and plate, said backing means including an orifice positioned at an upper transfer position for successive lug and aperture registry under wheel revolution, air suction means, part of said air suction means including a conduit embracingly surrounding said flange, said conduit having a slot in adjacency to the lugs through a retention zone along the upper part of the path of lug travel and effecting air suction communication to retain against said lugs the lug contents during lug inverted travel through said retention zone, said slot terminating substantially adjacent said transfer position, said air suction means including an outer air flow section positioned adjacent the periphery of said wheel to overlie said wheel slots and establish suction flow successively to the outer ends of said passageways under wheel revolution, said section having its initial end disposed substantially at the radial line intersecting said transfer position, whereby suction flow is established to transfer lug contents through said orifice and to deliver said contents to the outer end of said passageways respectively, said air flow section terminating at a position where the successive passageways are substantially horizontal, means blocking the outer open ends of said passageways extending from said transfer position to end adjacent the lower extremity of said wheel, said passageways being successively moved past the end of said blocking means to deposit by gravity the passageway contents upon the ground beneath, means for rotating said wheel, and means for establishing air suction in said air suction means.

3. In a seed planter device, a revolvably supported seed planter wheel comprising an outer disc, an inner disc, a plurality of pairs of structural members interposed between said discs and spacing said discs apart with said discs being firmly seated against and secured to said members, the members of each said pair of structural members being spaced apart to define a passageway, the respective said member pairs projecting tangentially from adjacent the hub part of said wheel in circumferentially substantially equally spaced relation establishing tangentially extending passageways angularly inclined from the hub part of the wheel in the direction of wheel revolution, one of said discs adjacent its outer edge having a plurality of sets of slots, said sets of slots being respectively spaced inwardly of and positioned in registering communication with the outer ends of the respective said passageways, said one disc adjacent but spaced from its axial center being apertured with a like plurality of apertures, said apertures respectively communicating with the inner root ends of the respective said passageways, a seed selecting planter plate having a flat brim secured to said one disc, said planter plate being conjointly revolvable with said wheel and including a circular flange joining said brim projecting perpendicularly away from said brim and said disc, a like plurality of lugs formed in said flange adjacent its junction with said brim, said lugs projecting into the interior of said flange, said flange provided with a like plurality of ports adjacent said lugs, said lugs being respectively in registered alinement with the respective said passageway apertures, whereby said wheel includes a plurality of radially extending passageways each of which has a related lug, fixed backing means between said one disc and said lugs segregating said lugs from said apertures throughout a majority of the circle of revolution of said wheel and plate, said backing means including an orifice positioned at an upper transfer position for successive lug and aperture registry under wheel revolution, air suction means, part of said air suction means including a conduit embracingly surrounding said flange and in air flow communication with said lugs through a retention zone along the upper part of the path of lug travel to retain against said lugs the lug contents during lug inverted travel through said retention zone, said air flow communication terminating substantially adjacent said transfer position, said air suction means including an outer air flow section positioned adjacent the periphery of said wheel to establish suction flow successively to the outer ends of said passageways under wheel revolution, said section having its initial end disposed substantially at the radial line intersecting said transfer position, whereby suction flow is established to transfer lug contents through said orifice and to deliver said contents to the outer end of said passageways respectively, means blocking the outer open ends of said passageways extending from said transfer position to end adjacent the lower extremity of said wheel, said passageways being successively moved past the end of said blocking means to deposit by gravity the passageway contents upon the ground beneath, means for rotating said wheel, and means for establishing air suction in said air suction means.

4. In a seed planter device, a seed planter wheel comprising an outer circular disc, an inner circular disc, a plurality of straight, uncurved, pairs of structural members interposed between said discs and spacing said discs apart with said discs being firmly seated against and secured to said members, the members of each said pair of structural members being spaced apart to define a passageway, the respective said member pairs projecting tangentially from adjacent the hub part of said wheel in circumferentially substantially equally spaced relation establishing tangentially extending uncurved passageways angularly inclined from the hub part of the wheel in the direction of wheel revolution, said wheel adjacent its radially outer periphery having a plurality of sets of slots, said sets of slots being resepectively positioned inwardly of the outer ends of said passageways and in registering communication with the outer ends of the respective said passageways, said wheel adjacent but spaced from its axial center being apertured with a like plurality of apertures, said apertures respectively communicating with the inner root ends of the respective said passageways, a seed selecting planter plate secured to one of said discs, said planter plate being conjointly revolvable with said wheel and including a like plurality of lugs, said lugs being respectively in registered alinement with the respective said passageway apertures, whereby said wheel includes a plurality of tangentially extending passageways each of which has a related lug, said wheel being used with air suction means communicating with said wheel and retaining against said lugs the lug contents during lug inverted travel through a retention zone along the upper part of lug travel, and said air suction means including an outer section successively communicating with said slots subsequently transferring said contents to the outer end of said passageways respectively, means blocking the outer open ends of said passageways terminating adjacent the lower extremity of said wheel, said passageways being successively moved to said lower extremity to deposit by gravity the passageway contents upon the ground beneath.

5. In a seed planter, a revolvably supported planter wheel having a plurality of tangentially extending passageways, said passageways angularly inclined relative to said wheel in the direction of revolution of said wheel, a seed selecting planter plate comprising a flat brim secured to said wheel, a circular flange secured perpendicularly to said brim and extending away from said brim and said wheel, a like plurality of lugs deformed from and projecting into the interior of said flange, said flange defining a bin area, seed supply means at one side of the bin area feeding into said bin area in the direction of wheel rotation, a restricter non-rotatably mounted in said bin area adjacent and spaced from said lugs, said restricter being arcuate and being of bevelled cross section with the bevel sloped toward said lugs, said restricter limiting seed access to said lugs to prevent overloading of said lugs, said planter plate being revolvable with said wheel for successive lug entry into the seed in said bin area to load said lugs, a regulator mounted in said bin area adjacent the opposite side of the bin area and spaced from said seed supply means, said regulator being rotatably driven in a direction opposite to the direction of planter plate revolution and opposing the flow of seed from said supply means, and means for transferring and delivering the contents of successive said lugs into and along said passageways for subsequent planting discharge.

6. In a seed planter, a revolvably supported planter wheel having a plurality of tangentially extending passageways, said passageways angularly inclined relative to said wheel in the direction of revolution of said wheel, a seed selecting planter plate comprising a flat brim secured to said wheel, a circular flange secured perpendicularly to said brim and extending away from said brim and said wheel, a like plurality of lugs deformed from and projecting into the interior of said flange, said flange defining a bin area, seed supply means at one side of the bin area feeding into said bin area in the direction of wheel rotation, a restrictor non-rotatably mounted in said bin area adjacent and spaced from said lugs, said restricter being arcuate and being of bevelled cross section with the bevel sloped toward said lugs, said restricter limiting seed access to said lugs to prevent overloading of said lugs, said planter plate being revolvable with said wheel for successive lug entry into the seed in said bin area to load said lugs, a regulator mounted in said bin area adjacent the opposite side of the bin area and spaced from said seed supply means, said regulator being rotatably driven in a direction opposite to the direction of planter plate revolution for agitating the seed in said bin area and opposing the flow of seed from said supply means, and means for transferring and delivering the contents of successive said lugs into and along said passageways for subsequent planting discharge.

7. In a seed planter device, a seed planter wheel comprising means defining a plurality of passageways tangentially extending away from the hub of said wheel, said wheel adjacent its outer periphery being slotted in registering communication with the outer ends of the respective said passageways, said wheel adjacent but spaced from its axial center being apertured with a like plurality of apertures, said apertures respectively communicating with the inner root ends of the respective said passageways, said passageways being angularly inclined from root ends to outer slotting in the direction of revolution of said wheel, said passageways being straight and uncurved, suction air means communicated successively with said passageways under wheel rotation, a seed selected planter plate secured to said wheel, said planter plate being conjointly revolvable with said wheel and including a like plurality of lugs, said lugs respectively in registered alinement with the respective said passageway apertures, whereby said wheel includes a plurality of tangentially extending passageways each of which has a related lug, said wheel being adapted for use with air means for retaining against said lugs the lug contents during lug inverted travel through a retention zone along the upper part of lug travel and for transferring said contents to the outer end of said passageways respectively, and means blocking the outer open ends of said passageways terminating adjacent the lower extremity of said wheel.

8. In a seed planter device, a seed planter wheel comprising means defining a plurality of passageways tangentially extending from the hub of said wheel, said wheel adjacent its outer periphery being slotted in registering communication with the outer ends of said passageways, said wheel adjacent but spaced from its axial center being apertured with a like plurality of apertures, said apertures respectively communicating with the inner root ends of the respective said passageways, said passageways being angularly inclined from root ends to outer slotting in the direction of revolution of said wheel, said passageways being straight and uncurved, suction air means communicated successively with said passageway under wheel rotation, a seed selecting planter plate detachably secured to said wheel, said planter plate being conjointly revolvable with said wheel and including lugs, each said lug being in registered alinement with a said passageway aperture, said wheel being adapted for use with air means for retaining against said lugs the lug contents during lug inverted travel through a retention zone along the upper part of lug travel and for transferring said contents to the outer end of said passageways, and means blocking the outer open ends of said passageways terminating adjacent the lower extremity of said wheel.

References Cited in the file of this patent
UNITED STATES PATENTS

| | | |
|---|---|---|
| 512,906 | Root | Jan. 16, 1894 |
| 1,462,847 | Behrens | July 24, 1923 |
| 1,637,834 | Oliver | Aug. 2, 1927 |
| 2,783,918 | Bramblett | Mar. 5, 1957 |
| 2,991,909 | Lamazou et al. | July 11, 1961 |
| 2,995,274 | Haun et al. | Aug. 8, 1961 |